United States Patent
Shin et al.

(10) Patent No.: US 10,019,830 B2
(45) Date of Patent: Jul. 10, 2018

(54) METHOD AND APPARATUS FOR RENDERING SAME REGIONS OF MULTI FRAMES

(71) Applicant: Samsung Electronics Co., Ltd., Suwon-si (KR)

(72) Inventors: Youngsam Shin, Hwaseong-si (KR); Wonjong Lee, Seoul (KR); Jaedon Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 26 days.

(21) Appl. No.: 14/514,642

(22) Filed: Oct. 15, 2014

(65) Prior Publication Data
US 2015/0287233 A1 Oct. 8, 2015

(30) Foreign Application Priority Data
Apr. 2, 2014 (KR) .......................... 10-2014-0039361

(51) Int. Cl.
*G06T 15/00* (2011.01)
*G06T 15/10* (2011.01)
*G06T 15/06* (2011.01)

(52) U.S. Cl.
CPC ............ *G06T 15/005* (2013.01); *G06T 15/06* (2013.01); *G06T 15/10* (2013.01)

(58) Field of Classification Search
USPC ................................................ 345/419, 426
See application file for complete search history.

(56) References Cited

U.S. PATENT DOCUMENTS

| | | | | |
|---|---|---|---|---|
| 6,556,200 B1* | 4/2003 | Pfister | ..................... | G06T 15/55 345/426 |
| 8,207,968 B1* | 6/2012 | Krishnaswamy | ....... | G06T 15/06 345/419 |
| 8,223,148 B1* | 7/2012 | Carr | ........................ | G06T 15/06 345/426 |
| 8,284,195 B2* | 10/2012 | Brown | ..................... | G06T 15/06 345/419 |
| 8,350,846 B2* | 1/2013 | Mejdrich | .............. | G06T 17/005 345/418 |
| 8,736,610 B2* | 5/2014 | McCombe | .............. | G06T 15/06 345/418 |

(Continued)

FOREIGN PATENT DOCUMENTS

JP 2666353 B2 6/1997
KR 10-1089638 B1 12/2011

OTHER PUBLICATIONS

Recheis, "Realtime Ray Tracing", 2008, pp. 1-9, XP002744115, Wien, Austria.

(Continued)

*Primary Examiner* — Kimbinh T Nguyen
(74) *Attorney, Agent, or Firm* — F. Chau & Associates, LLC

(57) ABSTRACT

A rendering method includes determining frames. The rendering method further includes successively rendering same regions of the frames. In another general aspect, rendering device includes an inter-frame determining unit configured to determine frames. The rendering device further includes a rendering unit configured to successively render same regions of the frames.

23 Claims, 12 Drawing Sheets

(56) References Cited

U.S. PATENT DOCUMENTS

| | | | | |
|---|---|---|---|---|
| 8,957,902 | B2* | 2/2015 | Bakalash | G06F 12/0875 345/426 |
| 9,003,461 | B2* | 4/2015 | Perlman | H04N 7/17318 725/115 |
| 9,235,921 | B2* | 1/2016 | Monson | G06T 15/06 |
| 9,270,965 | B2* | 2/2016 | Sandrew | H04N 9/79 |
| 2008/0024489 | A1 | 1/2008 | Shearer | |
| 2012/0254780 | A1 | 10/2012 | Mouton et al. | |
| 2013/0050213 | A1 | 2/2013 | McCombe et al. | |
| 2015/0262407 | A1* | 9/2015 | Fursund | G06T 15/80 345/426 |
| 2015/0262409 | A1* | 9/2015 | Morgan | G06T 15/60 345/421 |

OTHER PUBLICATIONS

Lee, et al. "SGRT: A Scalable Mobile GPU Architecture Based on Ray Tracing." ACM SIGGRAPH 2012 Posters. ACM, Aug. 5-12, 2012, Los Angeles, California, USA.

Arnau, et al.. "Parallel Frame Rendering: Trading Responsiveness for Energy on a Mobile GPU." Proceedings of the 22nd International Conference on Parallel Architectures and Compilation Techniques. IEEE Press, 2013, Piscataway, NJ, USA.

Extended European Search Report dated Sep. 18, 2015 in counterpart European Patent Application No. 14192530.5 (9 Pages, in English).

Dietrich, A., et al., "Adaptive Spatial Sample Caching," IEEE Symposium on Interactive Ray Tracing, 2007 (7 pages).

Moon, B., et al., "Cache-Oblivious Ray Reordering," ACM Transactions on Graphics (TOG), vol. 29, No. 3, Jun. 2010 (10 pages).

Scherzer, D., et al., "Temporal Coherence Methods in Real-Time Rendering," Computer Graphics Forum, vol. 31, No. 8, Blackwell Publishing Ltd, 2012 (29 pages).

Maten Larsson et al: "Inter-frame caching for high quality terrain rendering", SIGGRAPH 2004 : Los Angeles, California, Aug. 12, 2004, ACM Press, New York, p. 9, XP058118678, DOI:10.1145/1186223.1186235 ISBN:978-1-58113-896-2.

Office Action dated May 16, 2017, issued in corresponding European Patent Application No. 14192530.5.

* cited by examiner

METHOD AND APPARATUS FOR RENDERING SAME REGIONS OF MULTI FRAMES

CROSS-REFERENCE TO RELATED APPLICATION

This application claims the benefit under 35 USC 119(a) Korean Patent Application No. 10-2014-0039361, filed on Apr. 2, 2014, in the Korean Intellectual Property Office, the entire disclosure of which is incorporated herein in by reference for all purposes.

BACKGROUND

1. Field

The present disclosure relates to methods and apparatuses for rendering frames.

2. Description of Related Art

Three-dimensional (3D) rendering refers to an image processing whereby 3D object data is synthesized into an image viewed at a given viewpoint of a camera. Ray tracing refers to a process of tracing a point where scene objects to be rendered and a ray intersect. Ray tracing includes traversal for an acceleration structure and an intersection test between a ray and a primitive. For the traversal and the intersection test, a large amount of computation and a broad memory bandwidth may be needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided A rendering method including determining frames; and successively rendering same regions of the frames.

The same regions may be pixels or tiles at a same location.

The determining may include determining the frames to be frames included in a frame output interval.

The determining may include calculating an amount of change between acceleration structures of frames adjacent to each other, among the frames in the frame output interval, and determining the frames based on the amount of change between the acceleration structures.

The amount of change between acceleration structures may indicate a number of times when nodes of the acceleration structures are refit.

The determining may include determining the frames to be frames corresponding to the number of refits that is less than a set threshold value.

The determining may include calculating cache hit rates while primary rendering is performed on the frames, and determining the frames based on the cache hit rates.

The determining may include calculating an amount of change between acceleration structures of frames adjacent to each other, among frames in the frame output interval, calculating cache hit rates while primary rendering is performed on the frames, and determining the frames based on the amount of change between the acceleration structures and the cache hit rates.

A non-transitory computer-readable storing medium may store a program including instructions to cause a computer to perform the method.

In another general aspect, there is provided a rendering device including an inter-frame determining unit configured to determine frames, and a rendering unit configured to successively render same regions of the frames.

The inter-frame determining unit may be configured to determine the frames to be frames included in a frame output interval.

The inter-frame determining unit may be configured to calculate an amount of change between acceleration structures of frames adjacent to each other, among the frames in the frame output interval, and determine the frames based on the amount of change between the acceleration structures.

The inter-frame determining unit may be configured to determine the frames to be frames corresponding to the number of refits that is less than a set threshold value.

The inter-frame determining unit may be configured to calculate cache hit rates while primary rendering is performed on the frames, and determine the frames based on the cache hit rates.

The inter-frame determining unit may be configured to calculate an amount of change between acceleration structures of frames adjacent to each other, among frames in the frame output interval, calculate cache hit rates while primary rendering is performed on the frames, and determine the frames based on the amount of change between the acceleration structures and the cache hit rates.

In still another general aspect, there is provided a rendering method including selecting a first frame and a second frame, rendering a first region of the first frame, and rendering a region of the second frame that is identical to the first region of the first frame, before rendering a second region of the first frame other than the first region.

The first frame and the second frame may be adjacent to each other.

In yet another general aspect, there is provided a rendering device including an inter-frame determining unit configured to determine frames based on at least one of a number of refit nodes in acceleration structures for adjacent frames and cache hit rates while rendering is performed on the frames, and a rendering unit configured to render the frames.

The inter-frame determining unit may be configured to determine the frames to be the adjacent frames corresponding to the number of refit nodes that is less than a set threshold value.

The inter-frame determining unit may be configured to determine the frames to be frames corresponding to the cache hit rates greater than a set threshold value.

Other features and aspects will be apparent from the following detailed description, the drawings, and the claims.

Figure 1:
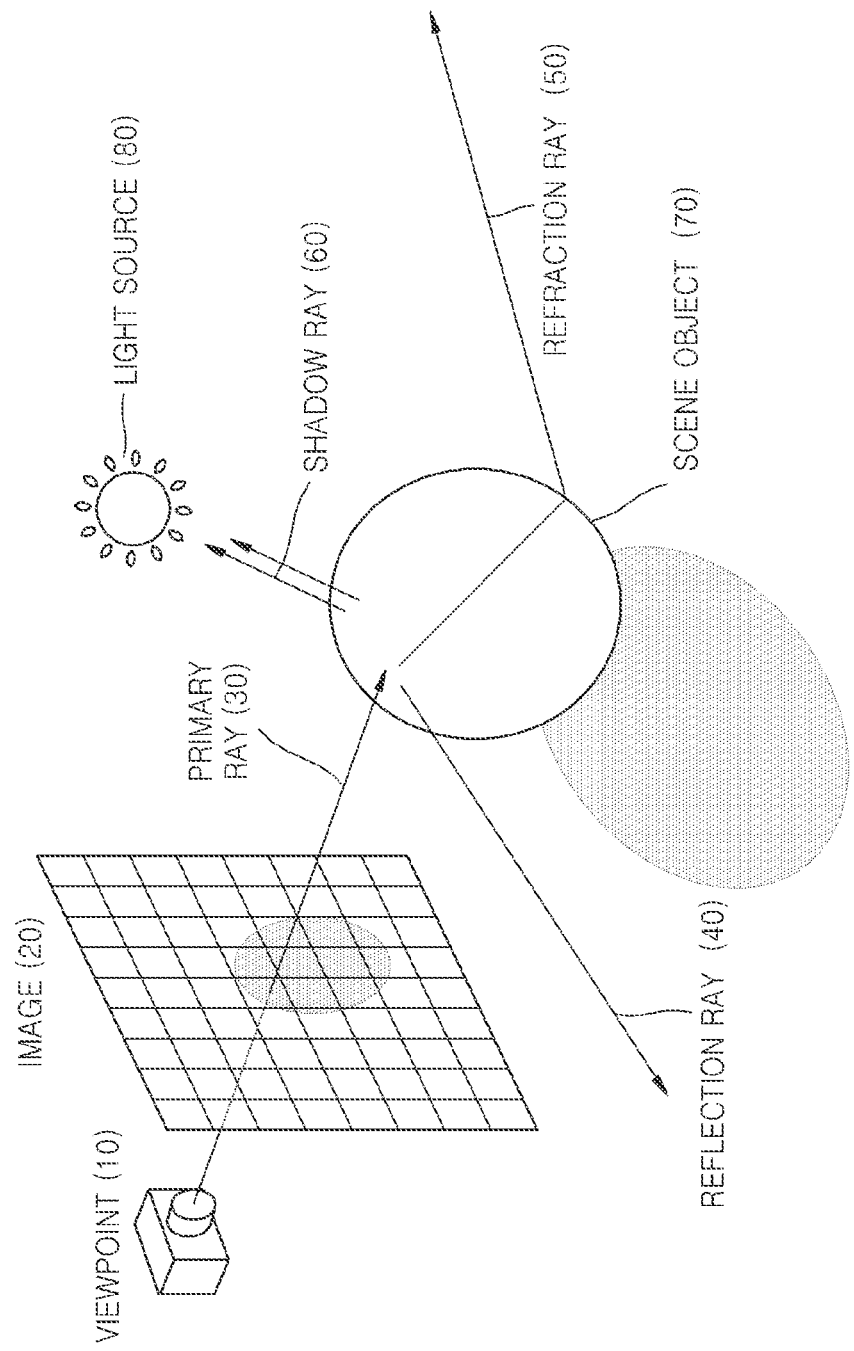
FIG. 1 is a schematic view illustrating an example of ray tracing.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a schematic view illustrating an example of ray tracing. Referring to FIG. 1, in three-dimensional (3D) modeling, a ray tracing core determines a viewpoint 10 and an image 20 according to the viewpoint 10. When the viewpoint 10 and the image 20 are determined, the ray tracing core generates a ray from the viewpoint 10 with respect to each pixel of the image 20.

Elements of ray tracing will be described. A primary ray 30 is generated from the viewpoint 10. The primary ray 30 intersects a scene object 70 after passing through the image 20. At an intersection point between the primary ray 30 and the scene object 70, a reflection ray 40 and a refraction ray 50 are generated. Also, a shadow ray 60 is generated at the intersection point toward a light source 80. The reflection ray 40, the refraction ray 50, and the shadow ray 60 are referred to as secondary rays. The scene object 70 denotes an object that is to be rendered with respect to the image 20. The scene object 70 includes a plurality of primitives.

The ray tracing core analyzes the primary ray 30, the secondary rays, that is, the reflection ray 40, the refraction ray 50, and the shadow ray 60, and rays derived from the secondary rays. The ray tracing core determines a color value of each of pixels that form the image 20 based on an analysis result. The ray tracing core determines the color value of each of the pixels by further considering characteristics of the scene object 70.

Figure 2:
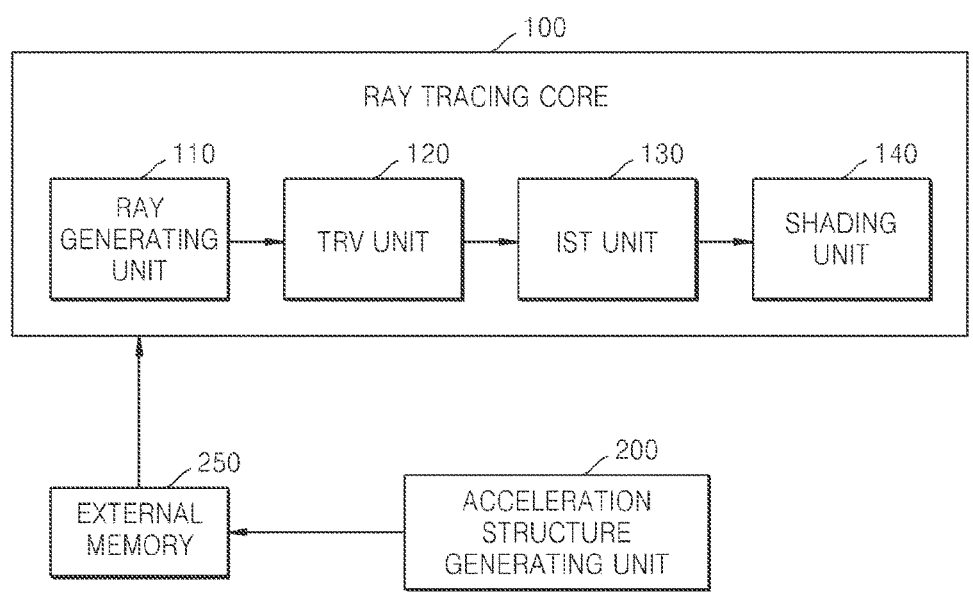
FIG. 2 is a block diagram illustrating an example of a ray tracing core.

FIG. 2 is a block diagram illustrating an example a ray tracing core 100. Referring to FIG. 2, the ray tracing core 100 includes a ray generating unit 110, a traversal (TRV) unit 120, an intersection test (IST) unit 130, and a shading unit 140. In FIG. 2, the TRV unit 120 and the IST unit 130 are included in the ray tracing core 100, but the TRV unit 120 and the IST unit 130 may also be included separately as hardware. The ray tracing core 100 illustrated in FIG. 2 includes only elements related to the current example. However, it will be obvious to one of ordinary skill in the art that other general-use elements than the illustrated ones in FIG. 2 may be further included in the ray tracing core 100.

The ray tracing core 100 traces an intersection point between generated rays and objects located in 3D space, and determines color values of pixels that form an image. In other words, the ray tracing core 100 searches for an intersection point between rays and objects, generates a secondary ray according to characteristics of an object at the intersection point, and determines a color value of the intersection point.

The ray tracing core 100 may use results of previous traversals of acceleration structures and previous intersection tests in a traversal of an acceleration structure and an intersection test. That is, the ray tracing core 100 may perform current rendering faster by applying results obtained from previous rendering to the current rendering.

The ray generating unit 110 generates a primary ray and a secondary ray. The ray generating unit 110 generates the primary ray from a viewpoint. The ray generating unit 110 generates a reflection, refraction, or shadow secondary ray at an intersection point between the primary ray and an object. Also, another reflection, refraction, or shadow secondary ray may be generated at an intersection point between the above secondary ray and the object. The ray generating unit 110 may generate a reflection ray, a refraction ray, or a shadow ray within a preset number of times, or may determine a number of times to generate a reflection ray, a refraction ray, or a shadow ray according to characteristics of an object.

The TRV unit 120 receives information about a ray generated by the ray generating unit 110. The generated ray may be a primary ray, a secondary ray, or a ray derived from the secondary ray. For example, regarding a primary ray, the TRV unit 120 may receive information about a viewpoint and a direction of the primary ray. Also, regarding a secondary ray, the TRV unit 120 may receive information about a starting point and a direction of the secondary ray. A starting point of a secondary ray denotes a point at which a primary ray has hit. A viewpoint or a starting point may be expressed by coordinates, and a direction may be expressed by a vector.

The TRV unit 120 reads information about an acceleration structure from an external memory 250. An acceleration structure is generated by an acceleration structure generating apparatus 200, and the generated acceleration structure is stored in the external memory 250. An acceleration structure refers to a structure including position information of objects in 3D space. For example, an acceleration structure may be a K-dimensional (KD) tree or a bounding volume hierarchy (BVH).

The TRV unit 120 traverses an acceleration structure to output an object or a leaf node that a ray has hit. For example, the TRV unit 120 searches for nodes included in an acceleration structure to output a leaf node of which a ray has hit among lowermost-ranking leaf nodes, to the IST unit 130. In other words, the TRV unit 120 determines which of bounding boxes that form an acceleration structure is hit by a ray. The TRV unit 120 determines which object included in a bounding box is hit by a ray. Information about a hit object is stored in a TRV cache. A bounding box may denote a unit including a plurality of objects or a plurality of primitives, and may be expressed in different forms according to an acceleration structure. The TRV cache denotes a memory that temporarily stores data used by the TRV unit 120 in traversal.

The TRV unit 120 may traverse an acceleration structure based on results of previous rendering. The TRV unit 120 may traverse an acceleration structure via a same route as previous rendering based on the results of the previous rendering that is stored in a TRV cache. For example, when the TRV unit 120 traverses an acceleration structure regarding a generated ray, the TRV unit 120 may traverse a bounding box that is hit by a previous ray having a same viewpoint and a same direction as the generated ray. Also, the TRV unit 120 may traverse an acceleration structure by referring to a search route with respect to a previous ray.

The IST unit 130 receives an object or a leaf node that is hit by a ray, from the TRV unit 120, and reads information about primitives included in the hit object or leaf node, from the external memory 250. The read information about the primitives may be stored in an IST cache. An IST cache denotes a memory that temporarily stores data used by the IST unit 130 in an intersection test.

The IST unit 130 conducts an intersection test between a ray and a primitive to output a primitive hit by the ray and an intersection point between the hit primitive and the ray. The IST unit 130 receives, from the TRV unit 120, information about which object is hit by the ray, and tests which primitives among a plurality of primitives included in the hit object are hit by the ray. After the IST unit 130 finds the primitive hit by the ray, the IST unit 130 outputs, to the shading unit 140, the intersection point indicating which point of the hit primitive intersects the ray. The intersection point may be output in coordinates.

The IST unit 130 may conduct an intersection test by using results of previous rendering. The IST unit 130 may conduct an intersection test on a same primitive as that of previous rendering based on results of the previous rendering that are stored in the IST cache. For example, when the IST unit 130 conducts an intersection test between a generated ray and a primitive, the IST unit 130 may conduct an intersection test on a primitive hit by a previous ray having a same viewpoint and a same direction as the generated ray.

The shading unit 140 determines a color value of a pixel based on information about an intersection point that is received from the IST unit 130, and properties of a material of the intersection point. The shading unit 140 determines a color value of a pixel by considering a basic color of the material of the intersection point and effects due to a light source.

The ray tracing core 100 receives, from the external memory 250, data needed in ray tracing. An acceleration structure generated by the acceleration structure generating unit 200 or geometry data indicating information about primitives is stored in the external memory 250. A primitive may be a polygon, such as a triangle or a rectangle, and geometry data may indicate information about a vertex and a position of each primitive included in an object.

The acceleration structure generating apparatus 200 generates an acceleration structure including position information about objects in 3D space. The acceleration structure generating apparatus 200 may generate various types of acceleration structures. For example, an acceleration structure may be generated by splitting 3D space in a hierarchical tree structure, and the acceleration structure generating apparatus 200 may generate a structure indicating a relationship between objects in 3D space by applying a BVH or KD tree. The acceleration structure generating apparatus 200 may determine a maximum number of primitives of a leaf node and a depth of tree, and generate an acceleration structure based on the determined maximum number and the determined depth of the tree.

Figure 3:
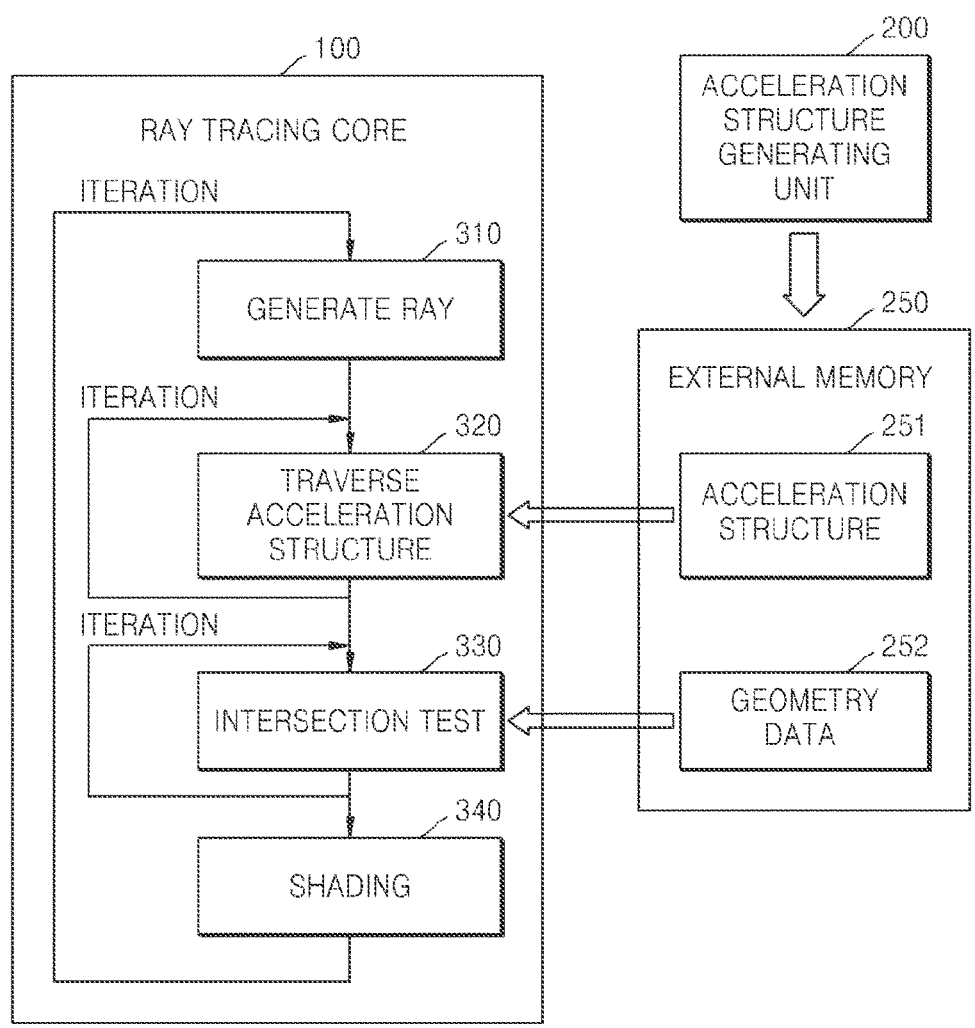
FIG. 3 is a diagram illustrating an example of ray tracing performed by the ray tracing core of FIG. 2.

FIG. 3 is a diagram illustrating an example of ray tracing performed by the ray tracing core 100 of FIG. 2. For example, the ray tracing core 100 may have the structure of the ray tracing core 100 shown in FIG. 2. Accordingly, descriptions above of the ray tracing core 100 also apply to the ray tracing of FIG. 3.

In operation 310, the ray tracing core 100 generates a ray corresponding to a pixel of an image. The ray tracing core 100 may generate a primary ray, a secondary ray, or a ray derived from the secondary ray.

In operation 320, the ray tracing core 100 traverses an acceleration structure 251 read out from the external memory 250. The ray tracing core 100 detects a bounding box hit by the ray, by traversing the acceleration structure 251 based on a viewpoint and a direction of the ray, and detects an object hit by the ray among objects included in the hit bounding box. The ray tracing core 100 repeats or iterates traversing the acceleration structure 251 until the hit object is detected. For example, the ray tracing core 100 may traverse the acceleration structure along a predetermined route, and when a leaf node on the searched route is not hit by the ray, the ray tracing core 100 may traverse other routes in the acceleration structure.

The ray tracing core 100 may sequentially traverse all routes, but may traverse a predetermined route based on search information of a previous ray. For example, the ray tracing core 100 may search a route in which a leaf node hit by the previous ray is included when the previous ray has a same or similar viewpoint and a same or similar direction as the current ray.

In operation 330, the ray tracing core 100 conducts an intersection test based on geometry data 252 of primitives that is read out from the external memory 250. The ray tracing core 100 iterates an intersection test until a primitive hit by the ray is detected. For example, the ray tracing core 100 conducts an intersection test on a primitive, and when the primitive is not hit by the ray, the ray tracing core 100 may conduct an intersection test on another primitive.

The ray tracing core 100 may sequentially conduct an intersection test on all primitives, but may conduct an intersection test on a predetermined primitive based on information about an intersection test of a previous ray. For example, the ray tracing core 100 may conduct an intersection test on a primitive that is hit by the previous ray when the previous ray and the current ray have a same or similar viewpoint and a same or similar direction.

In operation 340, the ray tracing core 100 conducts shading of the pixel based on the intersection test. After operation 340 is completed, the ray tracing core 100 returns to operation 310. That is, the ray tracing core 100 iterates operations 310 through 340 with respect to all pixels that form the image.

Figure 4:
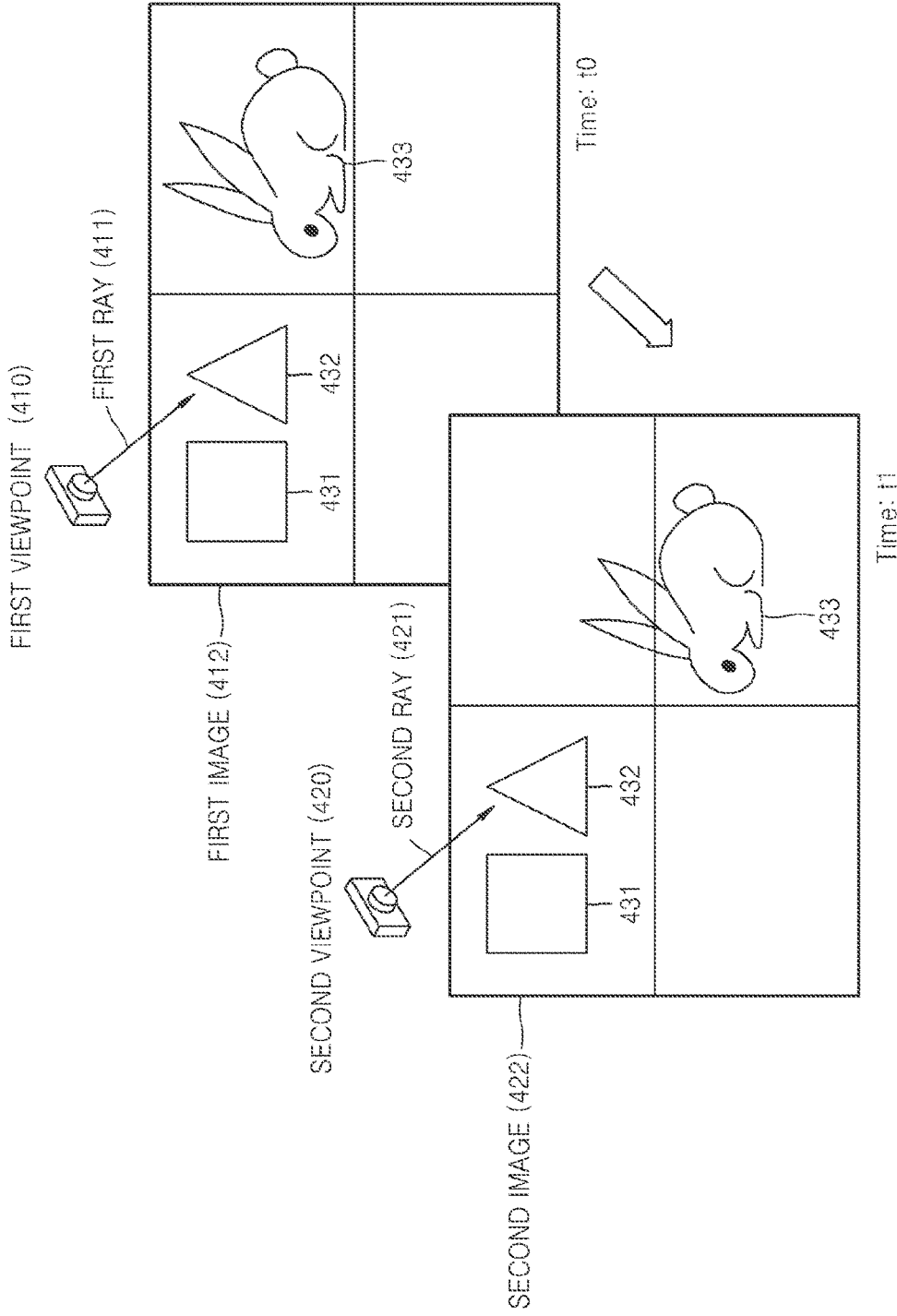
FIG. 4 is a schematic view illustrating an example of a method of accelerating ray tracing.

FIG. 4 is a schematic view illustrating an example of a method of accelerating ray tracing. Referring to FIG. 4, a first image 412 is an image that is rendered at t=0, and a second image 422 is an image that is rendered at t=1. As only a rabbit 433 moves in the first image 412 and the second image 422, and a rectangle 431 and a triangle 432 do not move in the first image 412 and the second image 422, the first image 412 and the second image 422 are similar to each other. Accordingly, the ray tracing core 100 may conduct rendering with respect to the second image 421 by using a result of rendering the first image 412. For example, when a first viewpoint 410 and a second viewpoint 420 are at a same position, and a first ray 411 and a second ray 421 are in a same direction, the ray tracing core 100 may accelerate ray tracing of the second ray 421 by applying a result of ray tracing with respect to the first ray 411. For example, the TRV unit 120 of the ray tracing core 100 may traverse a bounding box hit by the first ray 411 when conducting a search with respect to the second ray 421. Also, the IST unit 130 of the ray tracing core 100 may conduct an intersection test on a triangle 432 hit by the first ray 411 during an intersection test on the second ray.

Figure 5:
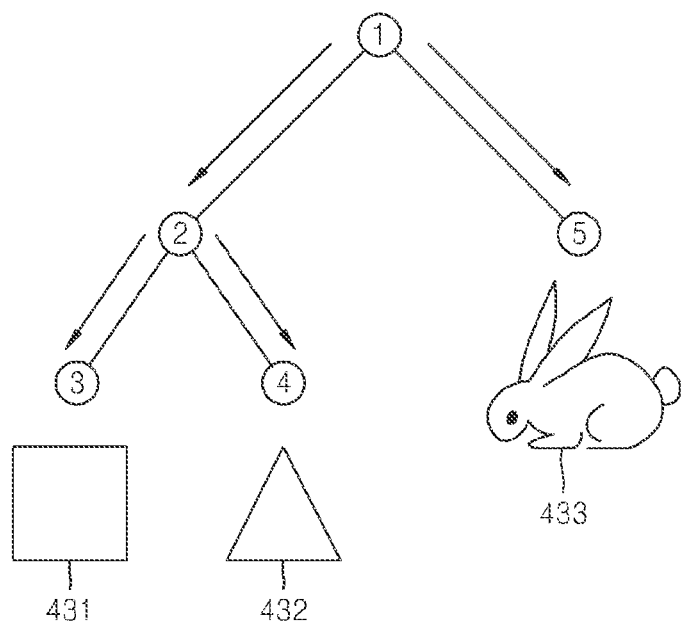
FIG. 5 is another schematic view illustrating the example of the method of accelerating ray tracing of FIG. 4.

FIG. 5 is another schematic view illustrating the example of the method of accelerating ray tracing of FIG. 4. Referring to FIG. 5, an acceleration structure includes five nodes, nodes 1 through 5, and nodes 3 through 5 each denote a leaf node.

The TRV unit 120 may search the acceleration structure along three routes. First, the TRV unit 120 may traverse the acceleration structure along node 1, node 2, and node 3, which are a first route. Secondly, the TRV unit 120 may traverse the acceleration structure along node 1, node 2, and node 4, which are a second route. Thirdly, the TRV unit 120 may traverse the acceleration structure along node 1 and node 5, which are a third route. When the TRV unit 120 conducts a search with respect to the second ray 421, the TRV unit 120 may traverse the second route via which the triangle 432 hit by the first ray 411 is searched. Accordingly, the TRV unit 120 may omit an operation of traversing the first route or the third route.

Figure 6:
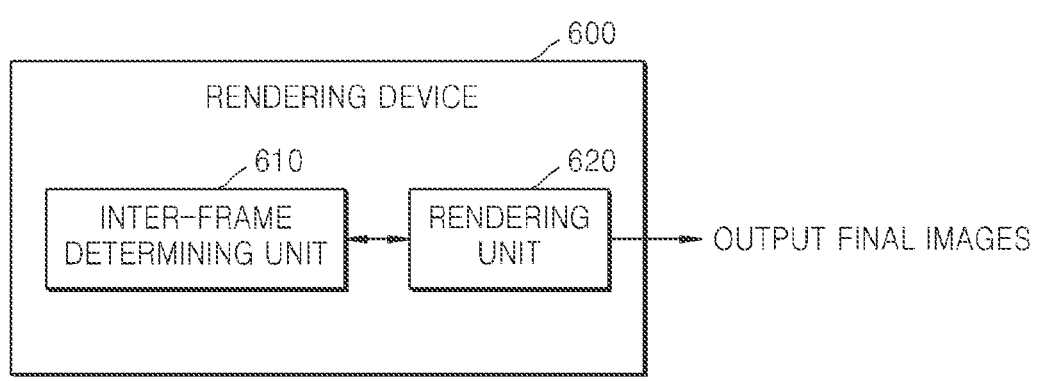
FIG. 6 is a block diagram illustrating an example of a rendering device 600.

FIG. 6 is a block diagram illustrating an example of a rendering device 600. The ray tracing core 100 as shown in FIG. 2 or FIG. 3 is an example of the rendering device 600 of FIG. 6. The ray tracing core 100 is a device that renders an image by using a ray, whereas the rendering device 600 denotes a device that renders an image.

Referring to FIG. 6, the rendering device 600 includes an inter-frame determining unit 610 and a rendering unit 620. Although not shown in FIG. 6, the rendering device 600 may further include a memory, a cache, etc.

The rendering device 600 determines a frame group, and may perform tile-based inter-frame rendering or pixel-based inter-frame rendering on frames in the determined frame group. The tile-based inter-frame rendering is a method of successively rendering tiles at a same location in a plurality of frames. The pixel-based inter-frame rendering is a method of successively rendering pixels at a same location in a plurality of frames.

The inter-frame determining unit 610 determines a plurality of frames for inter-frame rendering. The inter-frame determining unit 610 determines a number of frames that may be simultaneously rendered during a frame output interval. The frame output interval is determined based on a period of time needed for outputting an image.

For example, when rendering by using a ray tracing method, the inter-frame determining unit 610 may perform primary rendering of frames by using a primary ray, and may determine a number of frames to be simultaneously rendered based on a workload of the rendered frames. In other words, the inter-frame determining unit 610 may estimate a workload (or a calculation amount) for finally rendering frames based on a result of primary rendering of the frames. The inter-frame determining unit 610 may calculate a number of frames that may be rendered during a frame output interval based on the estimated workload. The inter-frame determining unit 610 may determine the number of frames to be simultaneously rendered based on a result of the calculation. If the rendering device 600 renders by using a primary ray only, rough images of frames may be generated faster as compared to if frames are rendered in consideration of all secondary rays.

A frame output interval is determined in consideration of a period of time to output an image without interrupting a user from watching a moving picture. Furthermore, with respect to an interactive scene, a frame output interval may be determined to be smaller than a response time to a user input.

The rendering unit 620 successively renders a same region of determined frames. The rendering unit 620 renders the frames included in a frame output interval, where the same region of the frames included in the frame output interval are successively rendered. In other words, the rendering unit 620 renders the frames by repeatedly rendering the same region of the frames, instead of rendering a whole frame, rendering a whole next frame, and so on. For example, the same region may be a pixel or a tile at a same location in the frames.

The inter-frame determining unit 610 calculates an amount of change of an acceleration structure between frames adjacent to each other, among a plurality of frames, and determines frames to be simultaneously rendered based on the amount of change. A plurality of frames may be selected from frames included in a frame output interval. Frames to be simultaneously rendered are referred to as a frame group.

For example, an amount of change of an acceleration structure may indicate a number of times when nodes of the acceleration structure that are used for tracing a ray are changed or refit. The rendering device 600 may change an acceleration structure regarding an initial frame, and may use the changed acceleration structure to trace rays in next frames. If a large number of nodes are refit, it may be efficient to generate a new acceleration structure instead of using an existing acceleration structure. The inter-frame determining unit 610 may not determine frames corresponding to large numbers of refit nodes due to largely changed data between adjacent frames as a frame included in a same frame group, and may determine frames corresponding to a number of refit nodes that is smaller than a pre-set threshold value as frames in a same frame group.

According to another example, the inter-frame determining unit 610 calculates a cache hit rate during primary rendering, and determines a frame group based on the calculated hit rate. When a result of primary rendering of frames by using a primary ray (or a main ray) only is received, the inter-frame determining unit 610 may calculate cache hit rates while the respective frames are rendered. Based on a cache hit indicating that the rendering device 600 accesses a cache to use data for rendering a frame, the inter-frame determining unit 610 may calculate a hit rate indicating a possibility that data exists when the rendering device 600 accesses the cache.

While performing primary rendering with respect to frames, the inter-frame determining unit 610 may calculate a cache hit rate, and may not determine frames corresponding to hit rates less than or equal to a set threshold value as frames in a same frame group. That is, the inter-frame determining unit 610 may determine frames corresponding to cache hits rates greater than the set threshold value as frames in a same frame group. Since the rendering device 600 uses same or similar data for primary rendering with respect to a plurality of frames, cache hit rates may be high. However, since same data is not shared with respect to frames dissimilar to one another, it is less likely for the rendering device 600 to use, for primary rendering of the frames, a cache in which data regarding previous frames is stored. Therefore, since a frame corresponding to a hit rate less than or equal to a designated value is a frame largely changed from a previous frame, the rendering device 600 may not perform an inter-frame rendering with respect to the frame together with previous frames.

The rendering unit 620 renders frames within a frame output interval and an inter-frame rendering range. In other words, the rendering unit 620 renders frames satisfying both the frame output interval and the inter-frame rendering range. The inter-frame rendering range includes an inter-frame rendering range based on an amount of change of an acceleration structure and an inter-frame rendering range based on a hit rate, where the rendering unit 620 renders frames satisfying one or both of the inter-frame rendering ranges.

Figure 7:
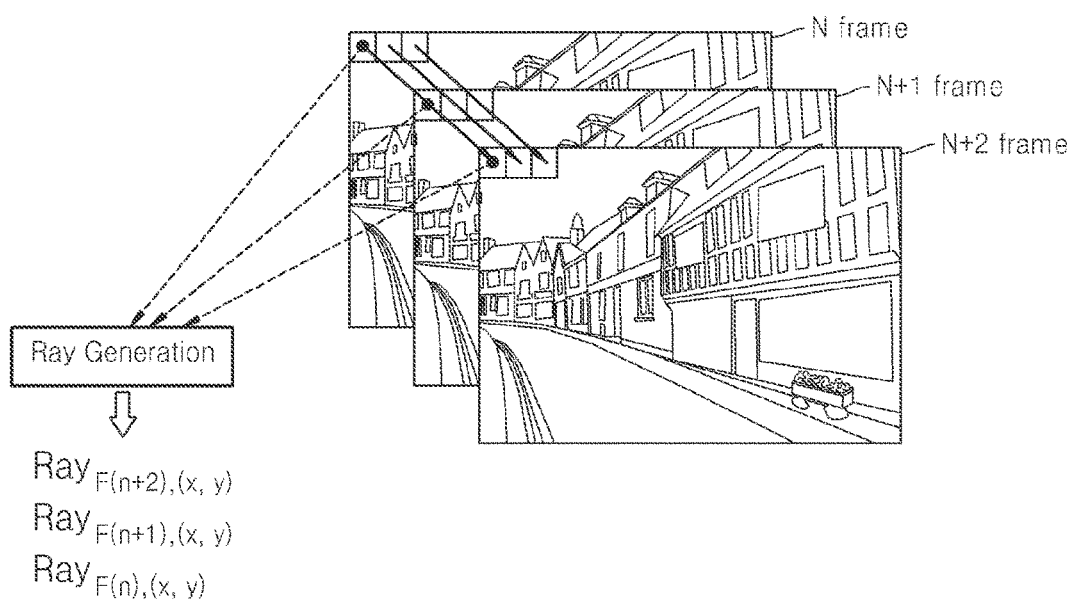
FIG. 7 is a diagram illustrating an example of a pixel-based inter-frame rendering.

FIG. 7 is a diagram illustrating an example a pixel-based inter-frame rendering. The operation described in FIG. 7 may be performed by the rendering device 600 shown in FIG. 6. Therefore, even if omitted below, any of the descriptions given above with respect to the rendering device 600 applies to FIG. 7 as well.

Referring to FIG. 7, the rendering device 600 successively renders a pixel at a same location of frames included in a same frame group. In FIG. 7, N through N+2 frames are included in the same frame group. Therefore, the rendering device 600 successively renders in a direction indicated by an arrow. For example, the rendering device 600 renders a (0,0) pixel of the N frame, a (0,0) pixel of the N+1 frame, and a (0,0) pixel of the N+2 frame. After the (0,0) pixels are rendered, the rendering device 600 successively renders a (1,0) pixel of the N frame, a (1,0) pixel of the N+1 frame, and a (1,0) pixel of the N+2 frame. The rendering device 600 renders all pixels of the N through N+2 frames, and completes rendering of the N through N+2 frames.

When tracing a ray, the rendering device 600 may generate the ray at a pixel at a same location. When generating rays with respect to a plurality of frames, a ray at a same location may be a ray with respect to a different frame, and thus, the rendering device 600 may add information indicating a frame corresponding to a ray in ray data. For example, a Ray,F(n),(x,y) may indicate a ray with respect to an (x,y) pixel of an $n^{th}$ frame, a RayF(n+1),(x,y) may indicate a ray with respect to an (x,y) pixel of an $n+1^{th}$ frame, and a RayF(n+2),(x,y) may indicate a ray with respect to an (x,y) pixel of an $n+2^{th}$ frame.

Figure 8:
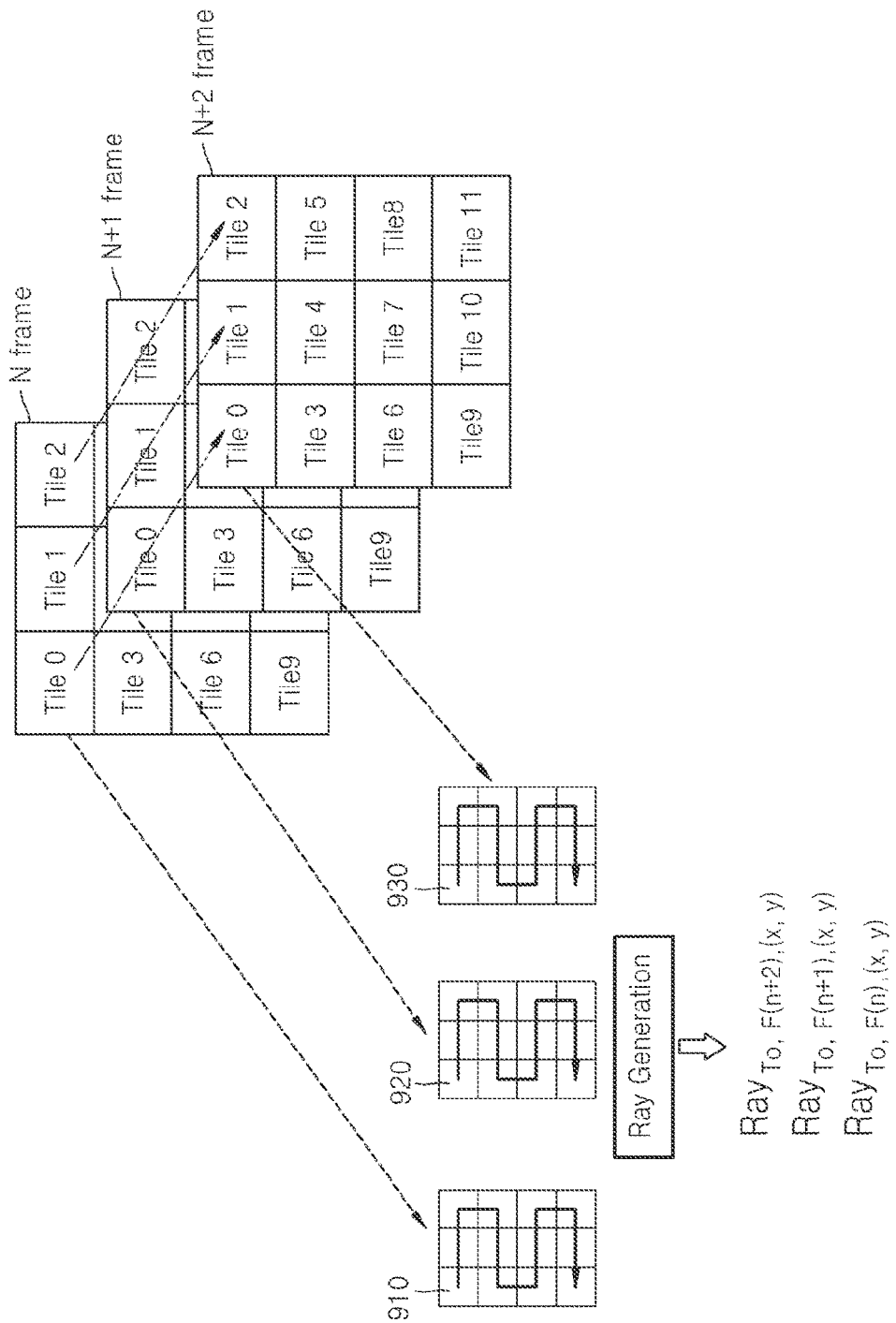
FIG. 8 is a diagram illustrating an example of a tile-based inter-frame rendering.

FIG. 8 is a diagram illustrating an example of a tile-based inter-frame rendering.

The operation described in FIG. 8 may be performed by the rendering device 600 shown in FIG. 6. Therefore, even if omitted below, any of the descriptions above with respect to the rendering device 600 applies to FIG. 8 as well.

Referring to FIG. 8, the rendering device 600 successively renders tiles at a same location of frames included in a same frame group. In FIG. 8, N frame through N+2 frames are frames included in the same frame group. Therefore, the rendering device 600 successively renders in a direction indicated by a chain double-dashed line. The rendering device 600 successively renders tiles at the same location of the successive frames in the direction indicated by the chain double-dashed line. For example, the rendering device 600 renders a tile 0 910 of the N frame, renders a tile 0 920 of the N+1 frame, and renders a tile 0 930 of the N+2 frame.

An order in which tiles are rendered in a single frame is indicated by a solid line arrow. After rendering the three tiles 0 910 through 930, the rendering device 600 renders a tile 1 of the N frame, renders a tile 1 of the N+1 frame, and renders a tile 1 of the N+2 frame. After rendering the three tiles 1, the rendering device 600 renders a tile 2 of the N frame, renders a tile 2 of the N+1 frame, and renders a tile 2 of the N+2 frame. The rendering device 600 sequentially renders all tiles of the N through the N+2 frames in the direction indicated by the solid line arrow, and completes rendering of the N through the N+2 frames.

When of tracing a ray, the rendering device 600 may generate a ray at a tile at a same location. When of generating rays with respect to a plurality of frames, a ray at a same location may be a ray with respect to a different frame, and thus, the rendering device 600 may add information indicating a frame corresponding to a ray in ray data. For example, a $Ray_{TO,F(n),(x,y)}$ may indicate a ray with respect to an (x,y) tile of an $n^{th}$ frame, a $Ray_{TO,F(n+1),(x,y)}$ may indicate a ray with respect to an (x,y) tile of an $n+1^{th}$ frame, and a $Ray_{TO,F(n+2),(x,y)}$ may indicate a ray with respect to an (x,y) tile of an $n+2^{th}$ frame.

Figure 9:
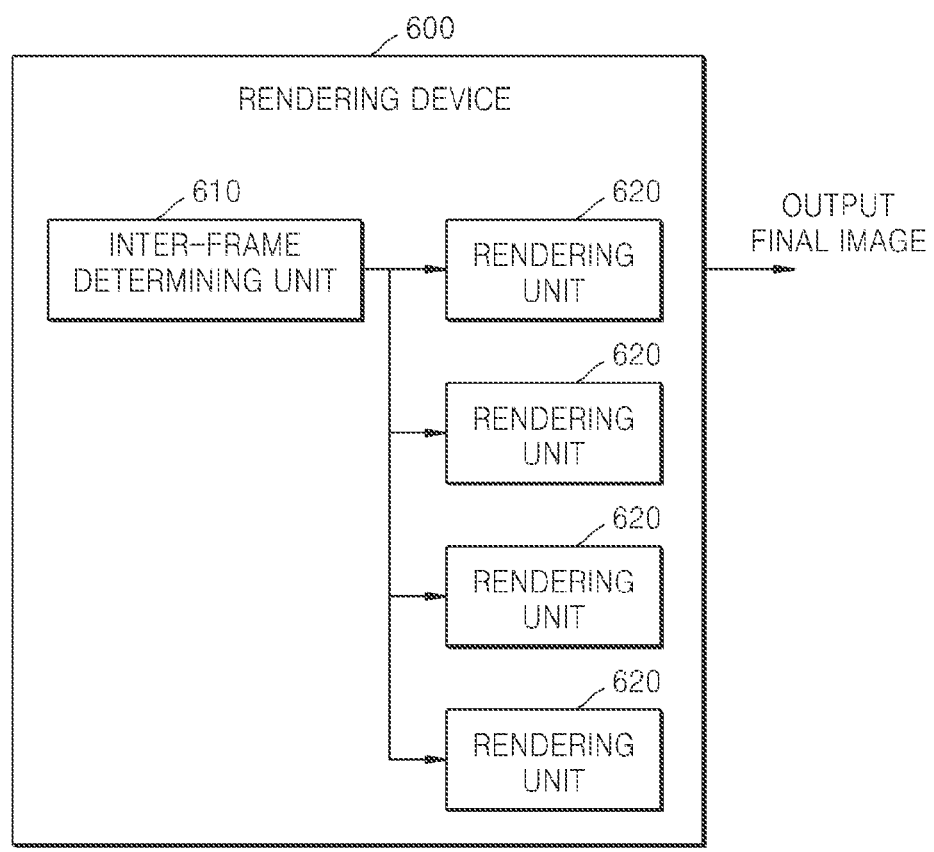
FIG. 9 is a block diagram illustrating another example of the rendering device of FIG. 6.

FIG. 9 is a diagram illustrating another example of the rendering device 600 of FIG. 6. Referring to FIG. 9, the rendering device 600 includes a plurality of rendering units 620. Therefore, the plurality of rendering units 620 may render pixels of a plurality of frames in parallel. In other words, the plurality of rendering units 620 may simultaneously render pixels at different locations. In the same regard, the plurality of rendering units 620 may render tiles of a plurality of frames in parallel. In other words, the plurality of rendering units 620 may simultaneously render tiles at different locations. Although FIG. 9 shows the four rendering units 620, the rendering device 600 may include less than or more than four rendering units. In an example of tracing a ray, each of the rendering units 620 may include the ray generating unit 110, the TRV unit 120, the IST unit 130, and the shading unit 140 of FIG. 2.

The plurality of rendering units 620 may be embodied by a single core, or the one rendering unit 620 may be embodied by a plurality of cores. The rendering units 620 may be respectively allocated to a plurality of cores, and individually perform rendering.

Figure 10:
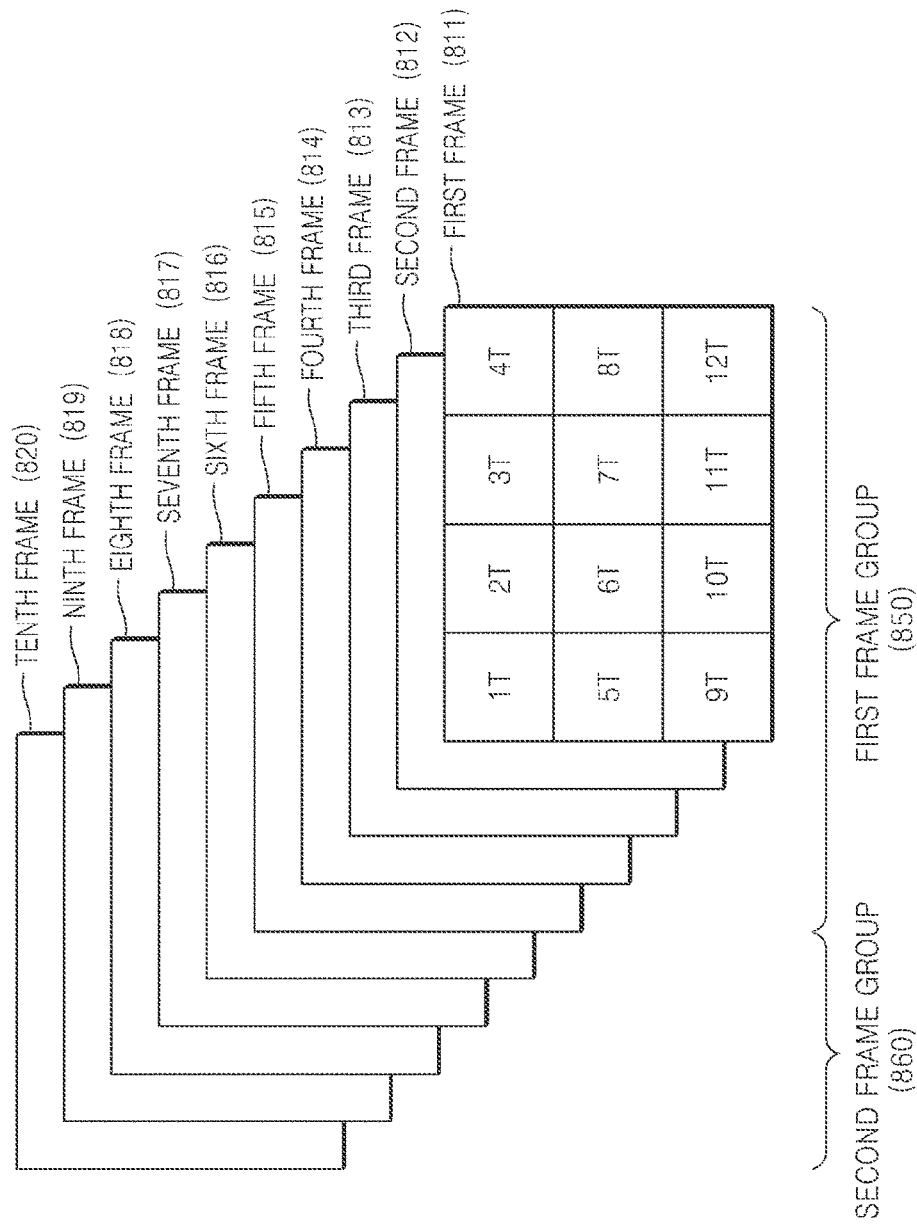
FIG. 10 is a diagram illustrating an example of a frame group.

FIG. 10 is a diagram illustrating an example of a frame group. FIG. 10 shows an example in which the rendering device 600 categorizes first through tenth frames 811 through 820 into two frame groups 850 and 860, and performs inter-frame rendering. A frame group indicates a range of performing inter-frame rendering at a same time. In other words, a frame group indicates frames of which same regions are successively rendered. Referring to FIG. 10, the first frame group 850 includes first through fifth frames 811 through 815, whereas the second frame group 860 includes sixth through tenth frames 816 through 820.

The rendering device 600 renders frames included in a same frame group based on pixels or tiles, and, when all frames in the same frame group are rendered, sequentially outputs final images of these frames. For example, in FIG. 10, the rendering device 600 renders the first through fifth frames 811 through 815 included in the first frame group 850 based on pixels or tiles, and, when a last pixel or a last tile of the fifth frame 815 is rendered, sequentially outputs final images of the first through fifth frames 811 through 815.

In an example of tile-based inter-frame rendering, divided tiles may have a same size or different sizes. For example, the rendering device 600 may divide the first frame 811 into twelve same-sized tiles 1T through 12T. Unlike in FIG. 10, sizes of divided tiles may be different from one another. The rendering device 600 may determine sizes of the tiles 1T through 12T in consideration of a workload of a frame, where the workload may be calculated based on a result of primary rendering.

The rendering unit 620 performs pixel-based inter-frame rendering or tile-based inter-frame rendering with respect to a determined frame group. For example, the rendering unit 620 renders the first through fifth frames 811 through 815 included in the first frame group 850. The rendering unit 620 performs primary rendering of first tiles 1T of the first through fifth frames 811 through 815 included in the first frame group 850, and then renders second tiles 2T of the first through fifth frames 811 through 815. Since the first tiles 1T of the first through fifth frames 811 through 815 may likely be a same image, the rendering unit 620 may render the first tile 1T of the second frame 812 by using a result of rendering the first tile 1T of the first frame 811. In the same regard, the rendering unit 620 renders the third through twelfth tiles 3T through 12T.

When the twelfth tile 12T of the fifth frame 815 is completely rendered, the rendering unit 620 sequentially outputs rendered images of the first through fifth frames 811 through 815. When the first frame group 850 is completely rendered, the rendering unit 620 renders frames of the second frame group 860 in the same regard as the first frame group 850.

Figure 11:
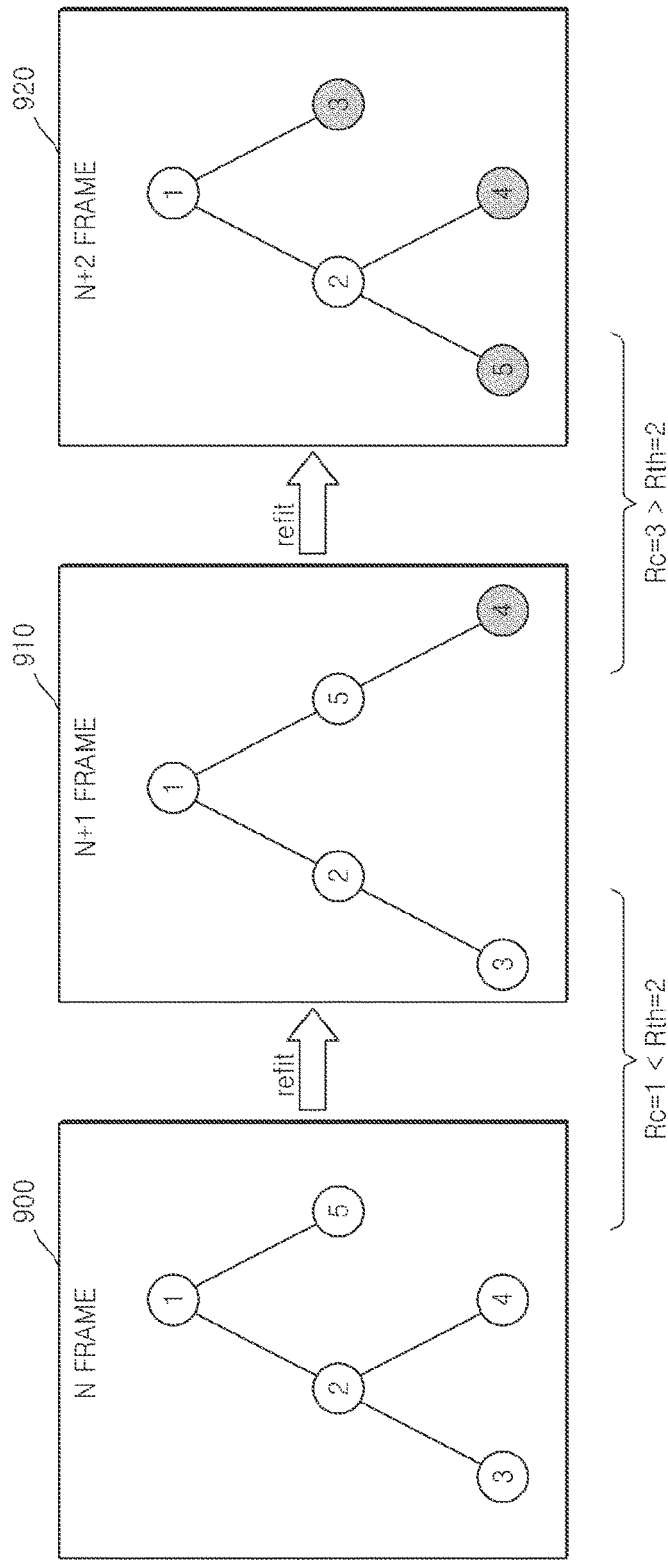
FIG. 11 is a diagram illustrating an example of a method of determining a frame group.

FIG. 11 is a diagram illustrating an example of a method of determining a frame group. Referring to FIG. 11, the inter-frame determining unit 610 determines a frame group by calculating a number of times that an acceleration structure is refit. In FIG. 11, refit nodes are shaded. Each of N through N+2 frames 900 through 920 have an acceleration structure including 5 nodes.

The rendering unit 620 refits the acceleration structure of the N frame 900, and uses the same for rendering the N+1 frame 910. In the acceleration structure of the N+1 frame 910, only a fourth node of the acceleration structure of the N frame 900 is refit. Therefore, the number of times of refits Rc is 1. If a set thershold value Rth regarding refit is set to 2, Rc is smaller than Rth. Therefore, the N frame 900 and the N+1 frame 910 belong to a same frame group.

On the other hand, in the acceleration structure of the N+2 frame 920, third, fourth, and fifth nodes of the acceleration structure of the N+1 frame 910 are refit. Therefore, the number of times of refits Rc is 3. If the set threshold value Rth regarding refit is set to 2, Rc is greater than Rth. Therefore, the N+1 frame 900 and the N+2 frame 910 do not belong to a same frame group. To conclude, the inter-frame determining unit 610 determines the N frame 900 and the N+1 frame 910 as the same frame group.

Figure 12:
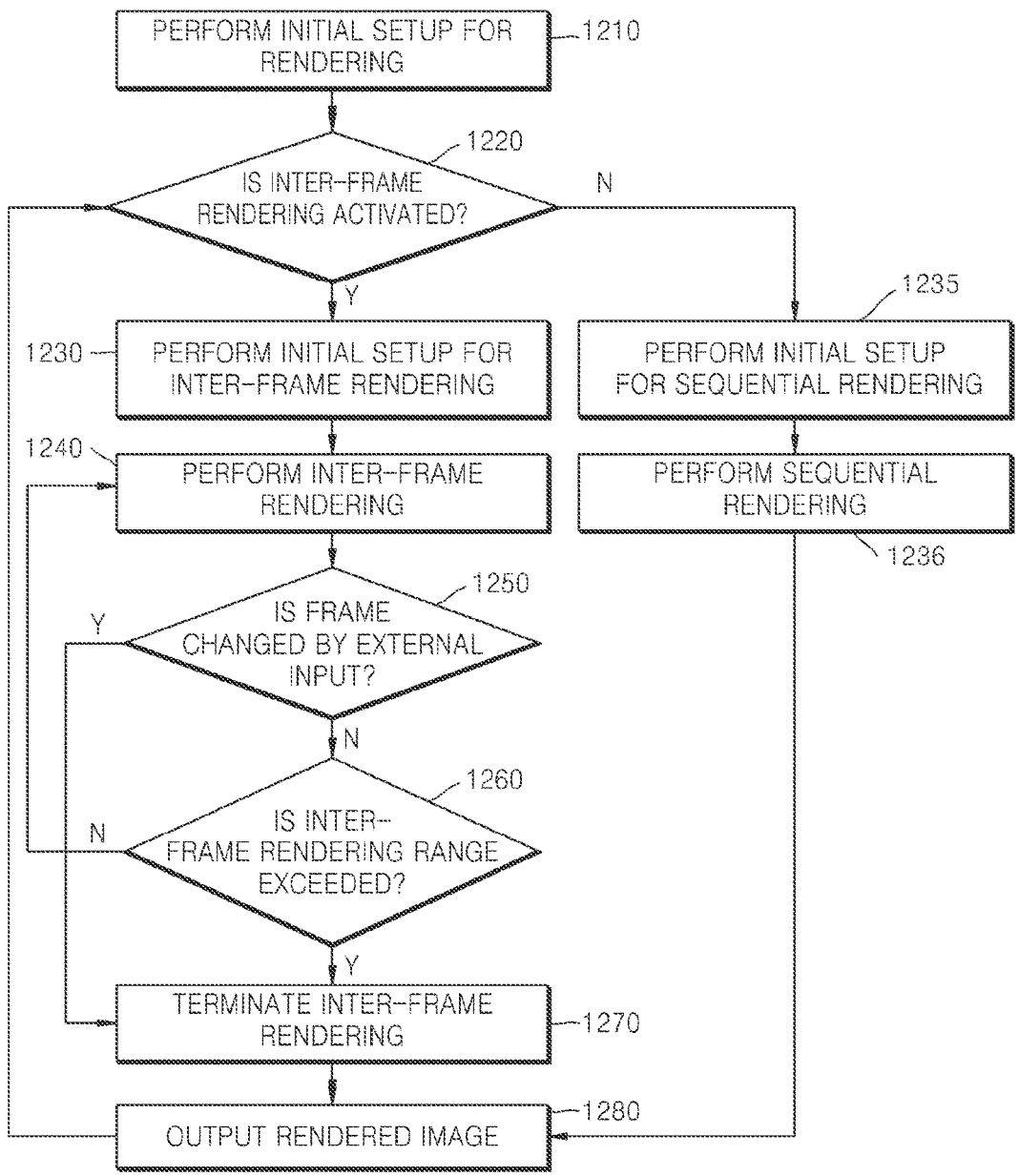
FIG. 12 is a flowchart illustrating an example of an inter-frame rendering method.

FIG. 12 is a flowchart illustrating an example of an inter-frame rendering method. FIG. 12 is a flowchart for describing operations via which the rendering device 600 of FIG. 6 renders. Therefore, even if omitted below, any of descriptions given above with respect to the rendering device 600 may also be applied to the inter-frame rendering method of FIG. 12.

In an operation 1210, the rendering device 600 performs an initial setup for rendering.

In an operation 1220, the rendering device 600 determines whether inter-frame rendering is activated. If inter-frame rendering is determined to be activated, the method proceeds to an operation 1230. If not, the method proceeds to an operation 1235. If inter-frame rendering is activated, the rendering device 600 may simultaneously render frames to be rendered.

In the operation 1230, the rendering device 600 performs an initial setup for inter-frame rendering. The rendering device 600 sets sizes of times dividing a frame, a frame output interval, a set threshold value of a cache hit rate, and a set threshold value Rth of a number of times of refits. The rendering device 600 also determines frame groups.

In an operation 1240, the rendering device 600 performs an inter-frame rendering. The rendering device 600 simultaneously renders frames of a same frame group.

In an operation 1250, the rendering device 600 determines whether a frame is changed by an external input. An external input is a user input, and a frame to be rendered may be changed based on an external input. When a frame to be rendered is determined to be changed, the method proceeds to an operation 1270. If not, the method proceeds to an operation 1260.

In the operation 1260, the rendering device 600 determines whether an inter-frame rendering range is exceeded. If the inter-frame rendering range is determined to be exceeded, the method proceeds to the operation 1270. If not, the operation proceeds to the operation 1240. An inter-frame rendering range indicates frames that are simultaneously rendered.

In the operation 1270, the rendering device 600 terminates inter-frame rendering. When a frame is changed by an external input or rendering is completed, the rendering device 600 terminates rendering.

In an operation 1280, the rendering device 600 outputs at least one rendered image.

In an operation 1235, the rendering device 600 performs an initial setup for sequential rendering. The sequential rendering is a general rendering method for rendering and outputting only one frame.

In an operation 1236, the rendering device 600 performs a sequential rendering.

Figure 13:
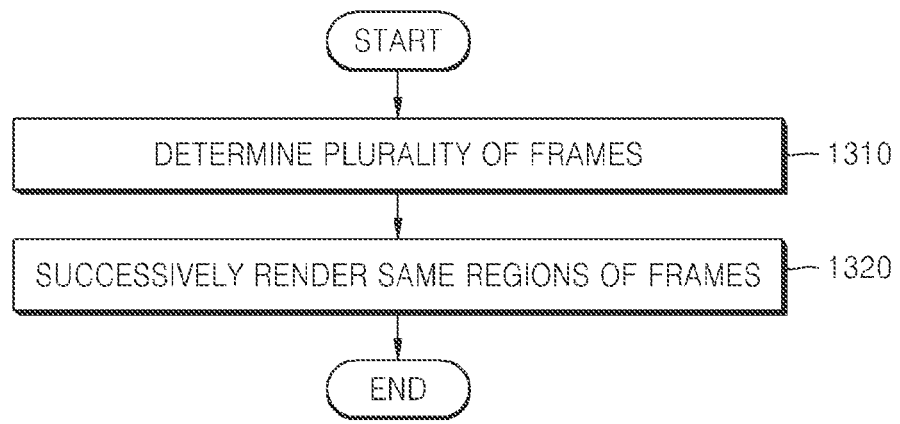
FIG. 13 is a flowchart illustrating an example of a rendering method.

FIG. 13 is a flowchart illustrating an example of a rendering method. FIG. 13 is a flowchart for describing operations via which the rendering device 600 of FIG. 6 renders. Therefore, even if omitted below, any of descriptions given above with respect to the rendering device 600 may also be applied to the rendering method of FIG. 13.

In an operation 1310, the rendering device 600 determines a plurality of frames.

In an operation 1320, the rendering device 600 successively renders same regions of the frames.

Figure 14:
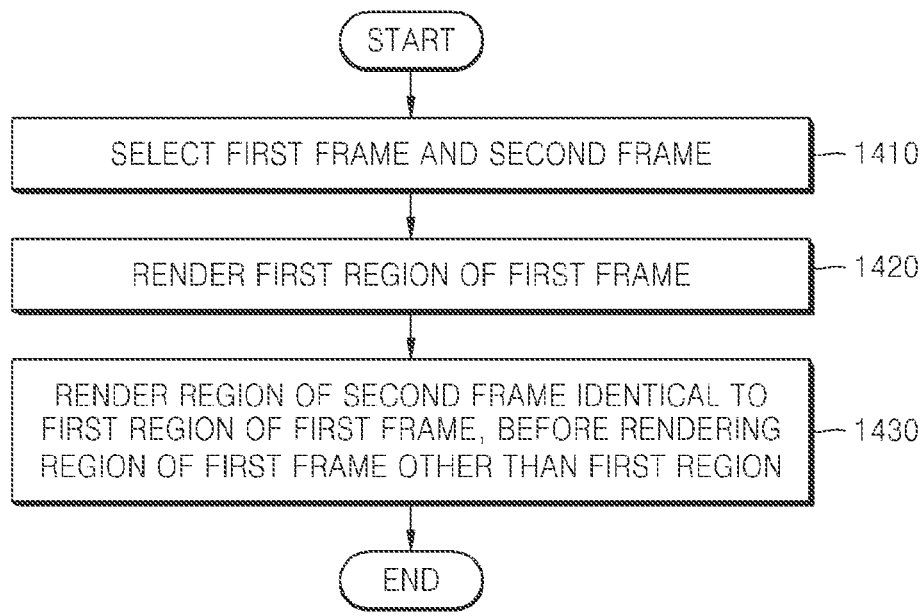
FIG. 14 is a flowchart illustrating another example of a rendering method.

FIG. 14 is a flowchart illustrating another example of a rendering method. The operation described in FIG. 14 may be performed by the rendering device 600 shown in FIG. 6. Therefore, even if omitted below, any of the descriptions given above with respect to the rendering device 600 applies to FIG. 14 as well.

In an operation 1410, the rendering device 600 selects a first frame and a second frame. The first frame and the second frame may be adjacent to each other.

In an operation 1420, the rendering device 600 renders a first region of the first frame. The first region may be a pixel or a tile of the first frame. The rendering device 600 renders one pixel or one tile of the first frame.

In an operation 1430, before rendering another region of the first frame other than the first region, the rendering device 600 renders a region of the second frame identical to the first region of the first frame. The identical region may be a pixel or a tile at a same location. For example, after rendering a first tile of the first frame, the rendering device 600 may render a first tile of the second frame before rendering another tile of the first frame. The first tile of the first frame and the first tile of the second frame indicate tiles at a same location in the frames. In another example, after rendering a first pixel of the first frame, the rendering device 600 may render a first pixel of the second frame before rendering another pixel of the first frame. The first pixel of the first frame and the first pixel of the second frame indicate pixels at a same location in the frames.

The examples of the method and apparatus described may successively render same regions of a plurality of frames. Also, by grouping similar frames and successively rendering the same, locality of data or similarity of ray tracing may be improved. Furthermore, by dividing tiles in consideration of a workload, a large number of frames may be inter-frame rendered within a frame output interval.

The number of frames to be inter-frame rendered may be determined based on a number of times when nodes of an acceleration structure are refit. In an example of rendering by using a primary ray, the number of frames to be inter-frame rendered may be determined based on a cache hit rate.

The various units, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A rendering method comprising:
   executing, by a processor of a graphics rendering device, operations comprising:
   determining whether first and second adjacent frames satisfy a similarity criterion, if so, designating the first and second frames as frames in a same frame group;
   if the first and second frames are in the same frame group:
   performing first primary ray tracing of a first primary ray for the first frame;
   performing second primary ray tracing of a second primary ray, from a viewpoint at a same position as that of the first primary ray, for the second frame in an accelerated manner by using a result of the first ray tracing;
   rendering, based on the first primary ray tracing, a first region of the first frame using a ray tracing core of the processor;
   rendering, based on the second primary ray tracing, a region of the second frame that is identical to a location of the first region, using the ray tracing core; and
   thereafter, rendering remaining regions of the first and second frames; and
   if the first and second frames are not in the same frame group, performing rendering of the second frame without using ray tracing results of the first frame.

2. The rendering method of claim 1, wherein the first region of the first frame and the region of the second frame are pixels or tiles at a same location.

3. The rendering method of claim 1, wherein frames in the same frame group are frames included in a frame output interval; and
   wherein a plurality of the frames in the same frame group are rendered during the frame output interval.

4. The rendering method of claim 3, wherein the determining comprises:
   calculating an amount of change between acceleration structures of the first and second frames; and
   determining whether the first and second frames belong to the same frame group based at least in part on the amount of change between the acceleration structures.

5. The rendering method of claim 4, wherein the amount of change between acceleration structures indicates a number of times when nodes of the acceleration structures are refit.

6. The rendering method of claim 5, further comprising:
   determining that at least one other frame adjacent to the first or second frame is to be included in the same frame group when a number of refits between the first or second frame and the at least one other frame is less than a set threshold value.

7. The rendering method of claim 1, wherein the determining comprises:
   calculating cache hit rates while primary rendering is performed on the first and second frames; and
   determining whether the first and second frames belong in the same frame group based at least in part on the cache hit rates.

8. The rendering method of claim 1, wherein the determining comprises:
   calculating an amount of change between acceleration structures of the first and second frames;
   calculating cache hit rates while primary rendering is performed on the first and second frames; and
   determining whether the first and second frames belong in the same frame group based on the amount of change between the acceleration structures and the cache hit rates.

9. A non-transitory computer-readable storing medium storing a program comprising instructions to cause a computer to perform the method of claim 1.

10. A rendering device comprising:
    a memory; and
    a processor configured to
    determine whether first and second adjacent frames satisfy a similarity criterion, if so, designate the first and second frames as frames in a same frame group;
    if the first and second frames are in the same frame group:
    perform first primary ray tracing of a first primary ray for the first frame;
    perform second primary ray tracing of a second primary ray, from a viewpoint at a same position as that of the first primary ray, for the second frame in an accelerated manner by using a result of the first ray tracing;
    render, based on the first primary ray tracing, a first region of the first frame, using a ray tracing core of the processor;
    render, based on the second primary ray tracing and using the ray tracing core, a region of the second frame that is identical to a location of the first region; and
    thereafter, render remaining regions of the first and second frames; and
    if the first and second frames are not in the same frame group, perform rendering of the second frame without using ray tracing results of the first frame.

11. The rendering device of claim 10, wherein the first region of the first frame and the region of the second frame are pixels or tiles at a same location.

12. The rendering device of claim 10, wherein the processor is configured to:
    determine the frames in the same frame group to be frames included in a frame output interval,
    wherein a plurality of the frames in the same frame group are rendered during the frame output interval.

13. The rendering device of claim 12, wherein the processor is configured to:
    calculate an amount of change between acceleration structures of the first and second frames; and determine whether the first and second frames belong to the same frame group based at least in part on the amount of change between the acceleration structures.

14. The rendering device of claim 13, wherein the amount of change between acceleration structures indicates a number of times when nodes of the acceleration structures are refit.

15. The rendering device of claim 14, wherein the processor is configured to:
determine that at least one other frame adjacent to the first or second frame is to be included in the frame group when a number of refits between the first or second frame and the at least one other frame is less than a set threshold value.

16. The rendering device of claim 10, wherein the processor is configured to:
calculate cache hit rates while primary rendering is performed on the first and second frames; and
determine whether the first and second frames belong in the frame group based at least in part on the cache ha rates.

17. The rendering device of claim 10, wherein the processor is configured to:
calculate an amount of change between acceleration structures of the first and second frames;
calculate cache hit rates while primary rendering is performed on the first and second frames; and
determine whether the first and second frames belong in the same frame group based on the amount of change between the acceleration structures and the cache hit rates.

18. A rendering method comprising:
executing, by a processor of a graphics rendering device, operations comprising:
selecting a first frame and a second frame;
rendering, using a ray tracing core of the processor, a first region of the first frame; and
rendering, using the ray tracing core, a region of the second frame that is identical to the first region of the first frame, before rendering a second region of the first frame other than the first region.

19. The rendering method of claim 18, wherein the identical first region and second region are pixels or tiles at a same location.

20. The rendering method of claim 18, wherein the first frame and the second frame are adjacent to each other.

21. A rendering device comprising:
a memory; and
a processor configured to
determine similar frames defining a frame group based on a number of refit nodes in acceleration structures for at least two successive frames while rendering is performed on the frames, wherein the similar frames are determined if the number of refit nodes is less than a set threshold value; and
render the frames hi an order of rendering a first region of all frames of the frame group at an identical location, followed by rendering a second region of all frames of the frame group.

22. The rendering device of claim 10, wherein the result of the first ray tracing is an intersection test (IST) result stored in an IST cache.

23. The rendering device of claim 10, wherein the result of the first ray tracing is a traversal (TRV) result stored in a TRV cache.

* * * * *